April 28, 1931. R. PUDELKO 1,802,735

ELECTRICITY METER CASING

Filed Feb. 18, 1928

INVENTOR
R. Pudelko
BY John D. Morgan
ATTORNEY

Patented Apr. 28, 1931

1,802,735

UNITED STATES PATENT OFFICE

RICCARD PUDELKO, OF ZUG, SWITZERLAND, ASSIGNOR TO LANDIS & GYR, A.-G., A JOINT-STOCK COMPANY, OF SWITZERLAND

ELECTRICITY-METER CASING

Application filed February 18, 1928, Serial No. 255,435, and in Switzerland February 21, 1927.

The invention relates to electricity meters and more particularly to a novel and useful device for fastening a cover to the base plate of an electricity meter.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrates one embodiment of the invention, and together with the description, serve to explain the principles of the invention.

Of the drawings:—

Figure 1:
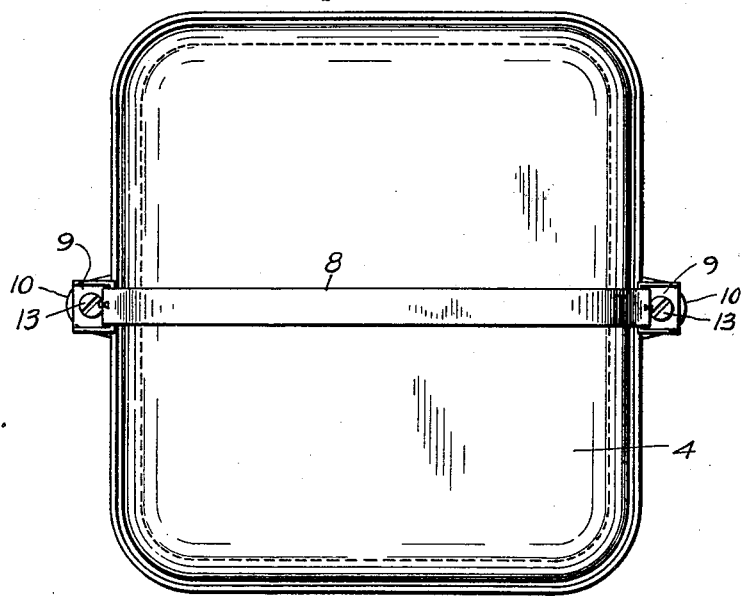
Fig. 1 is a plan view showing an embodiment of the invention.
Figure 2:
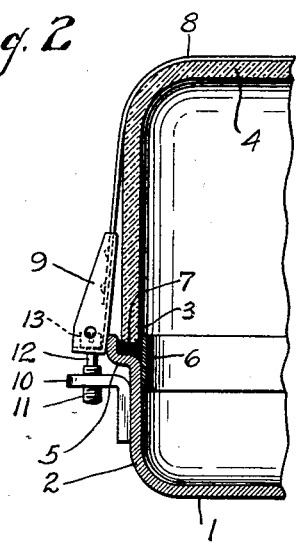
Fig. 2 is a fragmentary vertical section of the preferred embodiment of the meter cover fastening of Fig. 1.

The invention is directed to providing an improved device for securing the usual transparent meter cover or casing to the base plate of an electricity meter in such a way as to eliminate any strain on the cover material due to local pressures caused by the fastening means and to uneven expansion under temperature changes of contacting glass and metal, whereby cracking of the glass may occur; and to providing at the same time a neat, secure dust-proof and easily detachable meter casing.

In the usual and known forms of meter casings, particularly those which have a glass cover, the cover is attached directly to the base plate of the meter, either by studs or bolts which pass through apertures in the glass and the base plate and are held in place by nuts or other suitable tightening devices whereby the glass is pressed against the base plate; or by a metal band cemented to the edge of the glass cover and secured to the base plate.

In both types of cover fastenings mentioned above, certain strains are put upon the glass cover when fastening it to the base plate which frequently result in the cracking of the cover, thereby rendering it useless as a dust-proof casing. In the first case the nuts or bolt-heads, bearing against the glass at the points weakened by the apertures, exert a certain amount of local pressure which introduces strains into the glass at these critical points. In the second case where the glass and metal are joined by cement or other adhesive substance, there is a considerable tendency toward cracking of the glass due to tensions created through temperature changes, the temperature coefficients of glass and metal being different and their expansions and contractions being therefore unequal. These variations in expansion are likewise conducive to causing separation of the glass and metal, to thereby make possible the entry of dust into the casing. In addition to the disadvantages hereinbefore mentioned, which are primarily attendant upon glass meter covers, the described fastening devices require a certain amount of manipulation and consequent inconvenience in removing and replacing the cover. The studs or bolts must all be unscrewed to remove the cover and again individually tightened up when the cover is replaced.

The present invention over-comes the disadvantages of meter covers hereinbefore described by providing a fastening device which exerts no direct pressure on the meter cover, thereby eliminating any local pressures at points of weakness, doing away with the necessity for holes in the cover and by insuring that temperature changes will introduce no strain in the glass or other cover substance and that such changes will have no harmful effect on the security and dust-proof qualities of the meter casing.

The invention further provides a fastening device which is readily detachable, so that the meter cover can be removed and replaced by the unfastening of a single securing member.

In the present preferred embodiment of the invention, the contacting edges of the meter base plate and the cover are shaped to form a tongue and groove joint which may easily be rendered dust-proof by the use of a gasket or other sealing means. The cover is firmly secured to the base plate by means of a strap or band of metal or other suitable material placed over the cover and fastened to the base plate at either end by suitable attaching means. The fastening means of the present invention thereby provide a firm, secure and readily detachable fastening means which is attached only to the base plate of the meter and can thus exert no local pressure which might cause strains in the cover.

It will be understood that the present invention is not limited to glass meter covers, but may be used for securing a meter cover of any suitable material to the base plate of a meter, although finding its most useful application with glass covers, where the danger of cracking is so prevalent.

It will be understood that the foregoing general description and likewise the following detailed description are exemplary and explanatory of the invention, but are not restrictive thereof.

Referring now in detail to the embodiment of the invention, illustrated by way of example in the accompanying drawings, the base plate 1 of an electricity meter, which may preferably be formed of stamped or pressed sheet metal, has turned-up sides 2 which are provided at their edges with means for forming a close dust-proof fit with the cooperating edges 3 of the glass cover 4 while permitting free expansion and contraction of the metal and glass so as to prevent straining and consequent cracking of the cover. As embodied, the edge 5 of the base plate is outwardly flanged and forms, together with a metal strip 6, suitably attached to the inner edge of the sides 2 of the base plate, a groove or seat for receiving the edges 3 of the cover. A gasket 7 of rubber, cloth or other suitable material lies in the groove and serves to yieldingly support the cover while providing a tight dust-proof junction for the base plate and cover.

In accordance with the invention, means are provided for firmly and securely holding the cover 4 in the groove of the base plate while subjecting the glass to no local strains or pressures which might cause cracking. As embodied, a strap or band 8 of metal or other suitable material passes over the cover 4 preferably along the central portion thereof and extends down over the sides of the cover to the edges of the base plate. Welded to either end of strap 8 are angular members 9 for permitting the strap to be attached to the base plate.

The embodied means for permitting attachment of securing band 8 to the base plate comprise angled brackets 10 fixed to the sides 2 of the base plate 1 and having screw threaded openings therein which are adapted to receive the threaded portions of screws 11. Screws 11 have a reduced portion 12 which passes through a suitable aperture in the lower portion of the angled member 9 of the strap and a slotted head 13 which bears against the supporting portion of member 9.

It will be evident that the above-described construction provides a simple and convenient means for securing the cover to the base plate of the meter and for pressing the edges 3 of the cover into the gasketed groove of the base plate so that a dust-proof junction is obtained. The threaded securing screws 11 permit varying the tension on the securing band 8 within desired limits, while the unscrewing of one of the screws 11 permits the immediate removal of the cover from its seat.

The angular strap securing members 9 are provided with holes 9' for permitting the official sealing of the cover.

Figure 3:
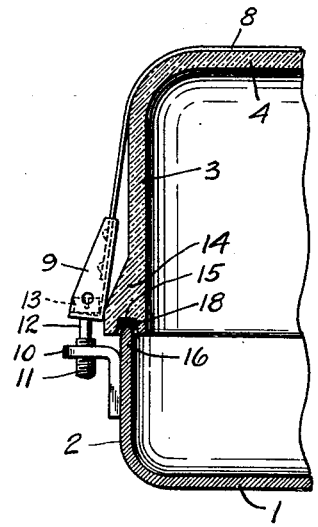
Fig. 3 is a fragmentary vertical section similar to Fig. 2 showing a modified form of the invention.

In Fig. 3 is shown a modified embodiment of the invention wherein the side 3 of the cover 4 is thickened or enlarged at its sealing edge 14. A groove 15 is formed in the thickened portion and is adapted to receive the straight vertical edge 16 of the base plate side 2. A suitable gasket 18 is embedded in the groove 15 for the purpose hereinbefore specified.

The invention in its broader aspects is not limited to the specific mechanisms shown and described but departures may be made therefrom within the scope of the accompanying claims without departing from the principles of the invention and without sacrificing its chief advantages.

What I claim is:—

1. In a meter cover fastening device in combination a base plate for a meter having a grooved seat, a glass meter cover adapted to cooperate with the grooved seat to form a close junction with the base plate, a flexible band passing around the cover for securing the cover to the base plate, screw-threaded means for attaching the band to the base plate and means for sealing the screw-threaded means and preventing unauthorized opening of the cover.

2. In a meter casing, comprising a metallic base plate, a cover portion of transparent material, one of said parts being provided with a peripheral groove, a gasket seated in said groove, a flexible band strap engageable with the cover, and means engageable with the base plate and strap for drawing the said base plate and cover portion into snug engagement with each other and with the interposed gasket.

3. A meter casing, comprising a metallic base plate, a cover portion of transparent material, a flexible band strap passing around the cover portion, and screw threaded means, engageable with the strap and base plate, for adjustably tightening the strap for drawing the base plate and cover in tight engagement with each other.

4. A meter casing, comprising a metallic base plate, a cover portion of transparent material, a gasket engageable with and positioned between the meeting edges of the base plate and cover, a flexible band strap passing around the cover and engageable substantially throughout its length with the cover, and screw threaded means, engageable with the band strap and with the base plate, for drawing the base plate and cover in tight engagement with each other and with the gasket.

5. In a meter cover fastening device, in combination, a base plate for a meter, a frangible vitreous transparent cover adapted to cooperate with the base plate, a yielding abutment disposed between the said plate and cover, a flexible band passing around the cover for securing the cover to the base plate, screw threaded lugs secured to the base plate, strap securing members affixed to the ends of the strap and screw threaded means engaging the strap securing members and the lugs whereby to force the cover and the base into locking engagement.

6. In a meter cover fastening device, in combination, a base plate for a meter having a grooved seat, a frangible meter cover adapted to cooperate with the grooved seat to form a close joint at the base plate, a gasket in the grooved seat for rendering the junction dust proof, a flexible strap engaging the surface of the cover and means associated with the strap and the base plate for locking the plate to the cover.

7. In a meter cover fastening device, in combination, a base plate for a meter, a frangible vitreous meter cover, a groove in one of the parts for receiving the closing edges of the other said part, and means attached only to the base plate for securing the cover to the base plate, said means comprising a strap member having a stirrup at either end and screw threaded means held by the stirrup and engaging the base plate.

8. In a meter cover fastening device, in combination, a base plate for a meter, a frangible vitreous meter cover, a groove in one of the parts for receiving the closing edges of the other said part, yielding gasket means disposed in said groove, and means attached only to the base plate for securing the cover to the base plate, said means comprising a strap member having a stirrup at one end and screw threaded means held by the stirrup and engaging the base plate.

9. In a meter cover fastening device, in combination, a base plate for a meter, a frangible vitreous meter cover, a groove in one of the parts for receiving the closing edges of the other said part, yielding gasket means disposed in said groove, and means attached only to the base plate for securing the cover to the base plate, said means comprising a strap member having a stirrup at either end and screw threaded means held by the stirrup and engaging the base plate, said stirrup including means for sealing the screw threaded means and preventing unauthorized opening of the cover.

10. A meter casing comprising a metallic base plate to support a meter, a cover, one of said parts being provided with a peripheral groove to receive the edge of the other, a flexible band passing around said cover to secure the cover to the base plate, means for tightening said band to draw the cover into tight engagement with the base plate and means for sealing the band to the base plate to prevent unauthorized removal of the cover.

11. A meter casing comprising a metallic base plate to support a meter, a cover adapted to tightly fit over said base plate, a flexible band passing around said cover to secure the cover to the base plate, means for tightening and securely fastening said band with the cover in tight engagement with the base plate and means for sealing the band to the base plate to prevent unauthorized removal of the cover.

In testimony whereof, I have signed my name to this specification.

RICCARD PUDELKO.